(12) United States Patent
Morando

(10) Patent No.: US 7,727,461 B2
(45) Date of Patent: Jun. 1, 2010

(54) FURNACE FILTRATION SYSTEM FOR MOLTEN METAL

(76) Inventor: Jorge A. Morando, 33125 Wintergreen Dr., Solon, OH (US) 44139

( * ) Notice: Subject to any disclaimer, the term of this patent is extended or adjusted under 35 U.S.C. 154(b) by 117 days.

(21) Appl. No.: 11/944,579

(22) Filed: Nov. 23, 2007

(65) Prior Publication Data
US 2009/0057965 A1  Mar. 5, 2009

Related U.S. Application Data

(60) Provisional application No. 60/968,825, filed on Aug. 29, 2007.

(51) Int. Cl.
*C21B 3/04* (2006.01)
(52) U.S. Cl. .................... 266/230; 266/239
(58) Field of Classification Search ............ 266/230, 266/239
See application file for complete search history.

(56) References Cited

U.S. PATENT DOCUMENTS 5,177,035 A * 1/1993 Gee et al. ............... 501/82

6,290,900 B1 * 9/2001 Hatano et al. ............ 266/227

* cited by examiner

*Primary Examiner*—Scott Kastler
(74) *Attorney, Agent, or Firm*—Steve M. Clemmons

(57) ABSTRACT

A furnace filtration system for improving the speed and efficiency of a molten metal centrifugal impeller pump contained within a non-ferrous molten metal furnace. The system includes a filtration well located upstream of the pump well. The filtration well includes a filter having a plurality of through filter passages that are sized to prevent any solid contaminants that are larger than the pump's impeller openings from passing therethrough. By preventing any contaminants that cannot pass through the pump, the pump can be run at a higher speed. A furnaces efficiency increases with the centrifugal pump's efficiency increases with its centrifugal pump's speed along with the flow and pressure. Increased flow and pressure increases a furnace's efficiency by a) increasing the melting rate; b) decreasing the energy lost by reducing the metal temperature stratification; and c) reducing the contaminants increases the quality of the metal produced while reducing the amount of nitrogen and chlorine needed to clean the metal.

17 Claims, 10 Drawing Sheets

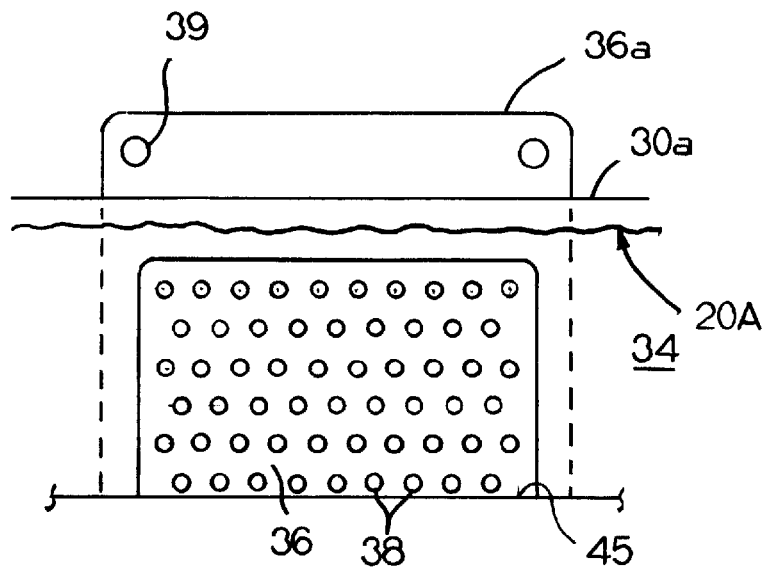
FIG. 4
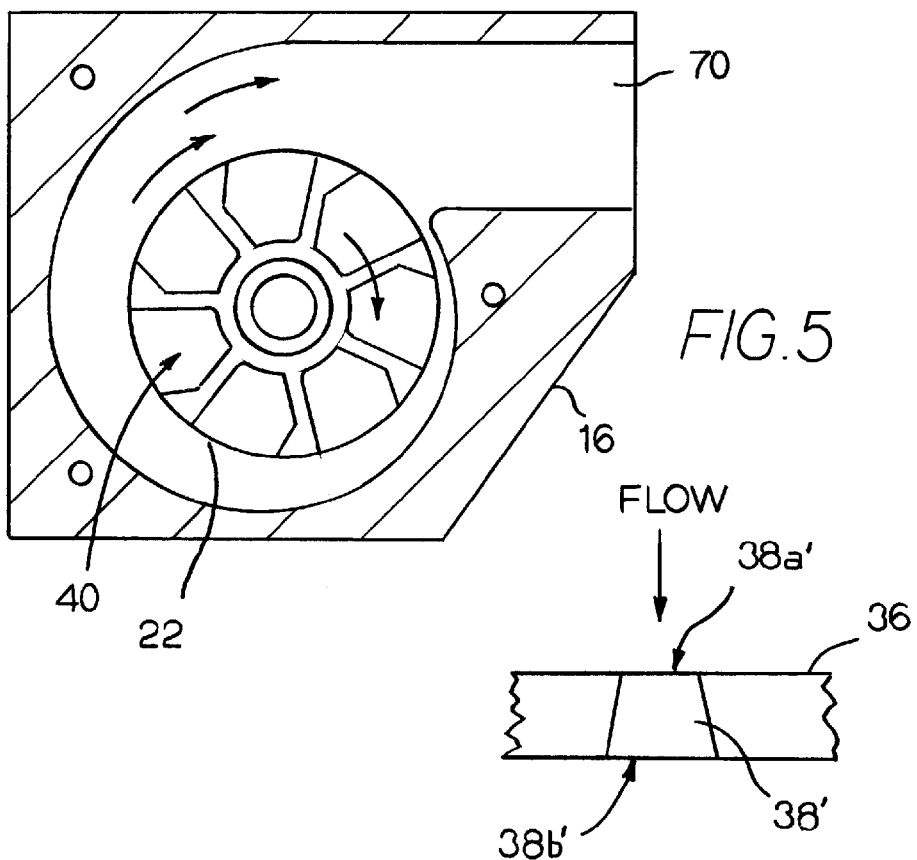
FIG. 5
FIG. 6

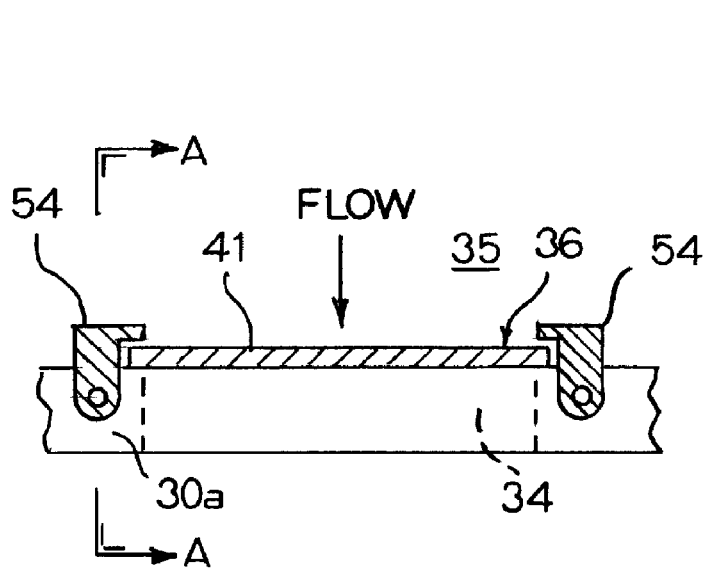
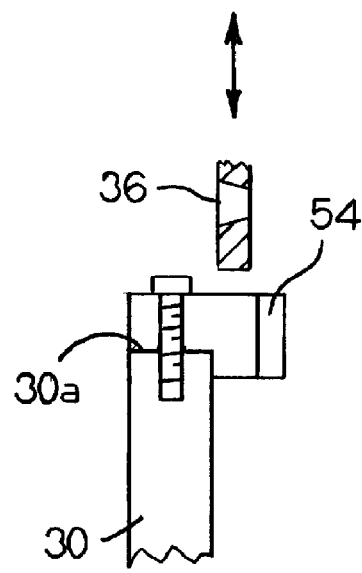
FIG. 10
FIG. 11
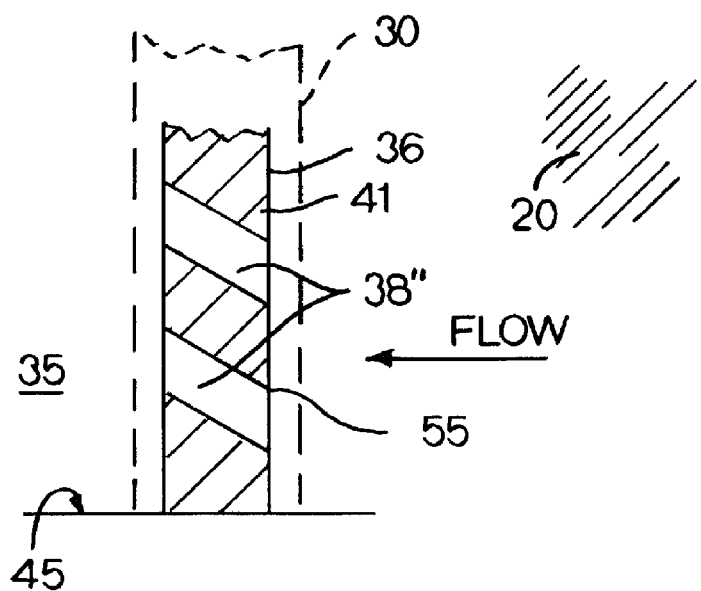
FIG. 12

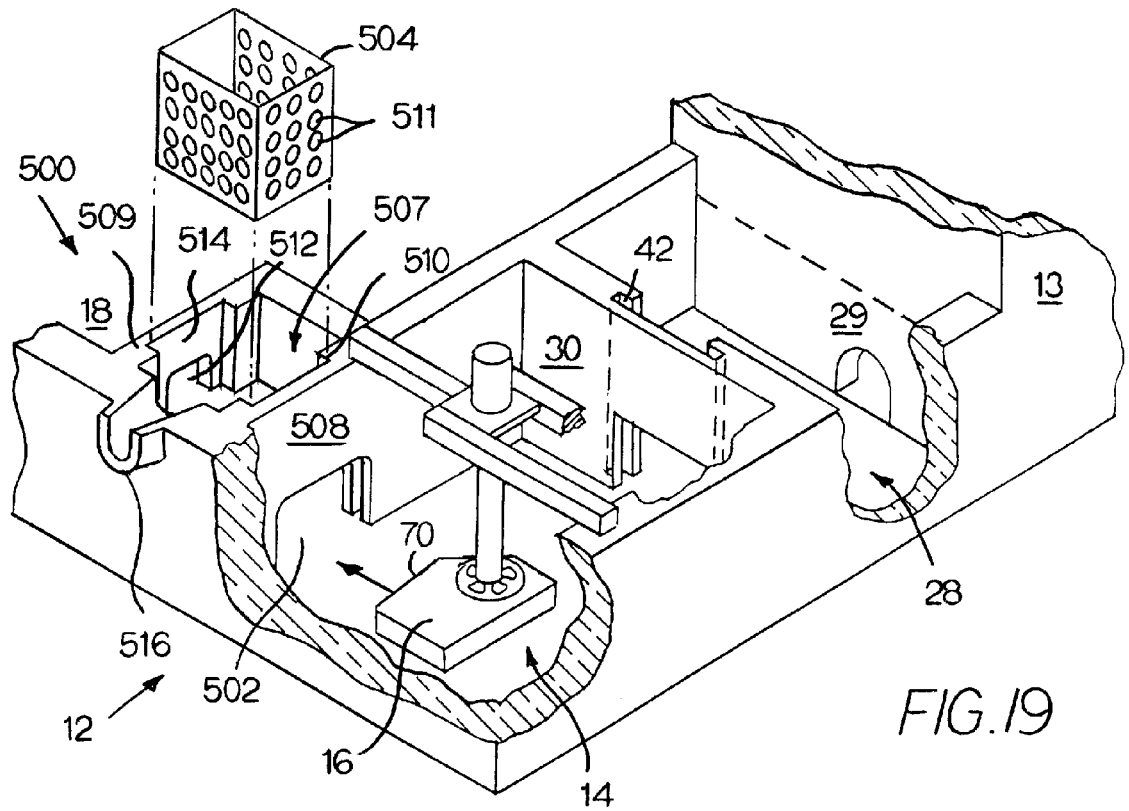
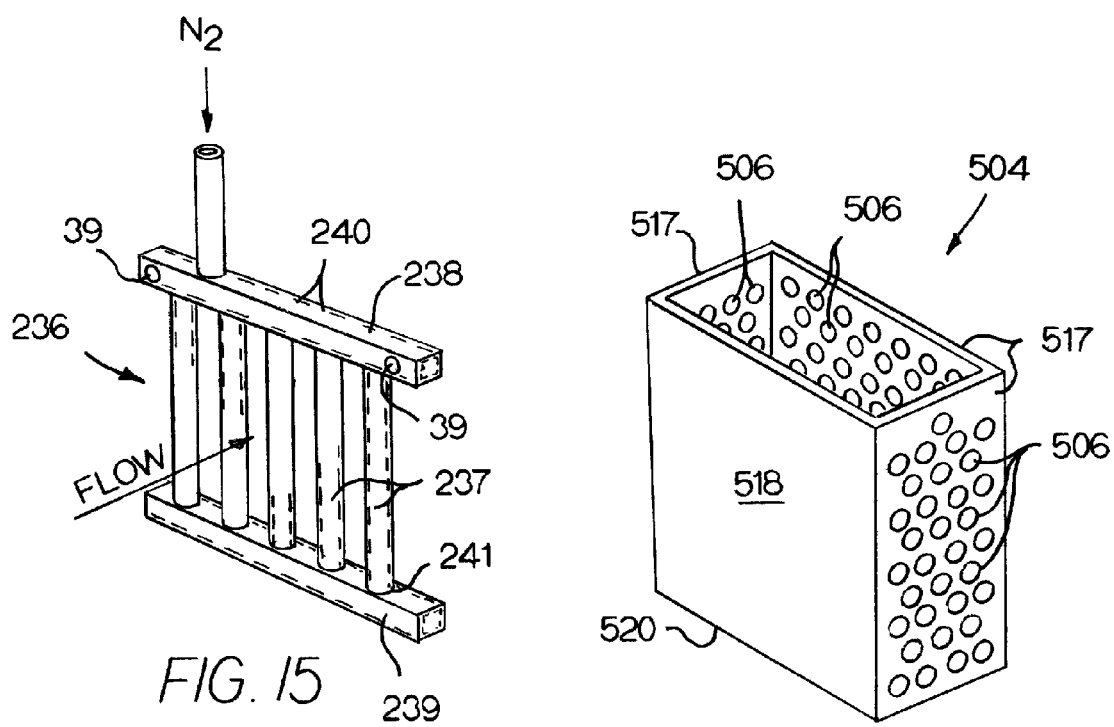

FURNACE FILTRATION SYSTEM FOR MOLTEN METAL

CROSS REFERENCE TO RELATED APPLICATION

This application claims the benefit of U.S. Provisional Patent Application Ser. No. 60/968,825, filed Aug. 29, 2007, titled Furnace Filtration System For Molten Metal, the disclosure of which is expressly incorporated by reference herein.

FIELD OF THE INVENTION

The present invention relates to the separation of solids from liquids and, more particularly, to filtering dross and other solid contaminants from molten metal.

BACKGROUND OF THE INVENTION

A typical molten metal facility includes a furnace with a pump for moving molten metal. During the processing of molten metals, such as aluminum, the molten metal is normally continuously circulated through the furnace by a centrifugal circulation pump to equalize the temperature of the molten bath. These pumps contain a rotating impeller that draws in and accelerates the molten metal creating a laminar-type flow within the furnace.

A well-known problem with such processes, however, is the accumulation of dross within the metal bath. Dross is a mass of solid impurities floating on and within a molten metal bath. It usually appears within molten metals or alloys having a relatively low melting point, such as tin, lead, zinc or aluminum, or by oxidation of these metals. Other impurities, such as pieces of the furnace's refractory material may also be found within such a molten metal bath.

The dross can range in size from small particles to relatively large pieces or chunks. The smaller dross material, while undesirable, does not normally pose a threat to the operation of the furnace and its circulation pump(s). However, the larger pieces of dross can, and often do, get pulled into the pump and cause the pump to become jammed, causing catastrophic failure to occur.

As a result of this problem, furnace operators frequently must run their circulation pumps at a relatively low speed, such as approximately 250-300 rpm. This slower speed, while reducing the damage to the pump components if a larger piece of dross becomes lodged therein, results in the undesirable condition of the pump motor being operated at much less than peak efficiency. That is, through the use of a frequency converter, a motor can produce the necessary torque at these lower speeds, but resulting in only using 10-15% of the available motor horsepower.

Another common solution to the pump-damaging large dross pieces within a furnace is to install larger and larger pumps having impellers that will receive and transfer all but the largest contaminants. These pumps, however, are expensive and they waste energy by continually pushing the dross through the system. Furthermore, as the dross is circulated through the furnace along with the molten metal, the dross pieces tend to accumulate together or conglomerate to create larger and larger pieces. Eventually, these growing pieces of dross may reach a size that will jam within even a very large impeller.

Currently, there are filters that are placed at the furnace discharge. These filters prevent dross from exiting the furnace—not from entering the pumps. Additionally, they do not provide for a user to collect the filtered contaminants from the system. Instead, the contaminants are left free to settle throughout the furnace.

In view of the current inefficient use of molten metal pumps, there is a need for a system for filtering the larger dross pieces in the furnace from entering a molten metal pump, thereby allowing the pump to operate at higher speeds and increasing efficiency within the system. Additionally, there is a need for such a filtering system that enables a user to quickly clean out the accumulated filtered contaminants from the furnace.

SUMMARY OF THE INVENTION

The present invention provides a filtration well adapted to filter solid contaminants from a bath of molten metal that are too large to pass through the impeller openings of a centrifugal impeller pump located within a pump well. The filtration well includes at least two walls that cooperate to define an enclosure having an upstream section and a downstream section, wherein the upstream section includes an inlet arch and the downstream section includes an outlet arch. The outlet arch is in direct fluid communication with the pump well. A filter covers the outlet arch and includes bore means which prevent solid contaminants that are sized larger than the impeller openings from passing therethrough, but allow solid contaminants that are smaller than the impeller openings to flow through.

The present invention also provides a filtration system for a molten metal bath having a pump well containing a centrifugal impeller pump. The impeller pump having impeller openings which receive and pump molten metal and any solid contaminants within the molten metal that are smaller than the impeller openings. The filtration system includes an upstream filtration well that is fluidly coupled upstream to the pump well. The filtration well including an inlet wall having an enlarged inlet opening and a spaced outlet wall having an enlarged outlet opening, wherein the filtration well is in fluid communication with the pump well through the outlet opening. The filtration system also includes a furnace filter having a body that is sized to cover the outlet opening. The body includes a plurality of filter bores or openings, each of the filter bores or openings being smaller than the impeller openings, whereby contaminants larger than the filter bores are retained within the upstream filtration well and molten metal and contaminants smaller than the filter bores pass through the furnace filter and into the pump well. The filtration system also includes means for removably retaining the furnace filter over the outlet opening.

The present invention further provides a method of increasing the operating speed of a centrifugal pump within a bath of molten metal. This method includes the steps of: forming a filtration well directly upstream of the pump well, wherein the filtration well includes a pair of spaced walls, wherein one of the walls includes an inlet arch and the other wall includes an outlet arch, the outlet arch being in fluid communication with said pump well; providing a furnace filter; and preventing all solid contaminants that are larger than the pump's impeller openings from entering the pump well by covering the outlet arch with the furnace filter.

The present invention is a molten metal filtering system that prevents over-sized contaminants from being pulled into a molten metal recirculation pump. This system includes a filter well that is disposed upstream of the furnace's pump well. The filter well is generally defined by two pairs of spaced opposed walls. These walls act as an inlet and outlet to the filter well as each has a through opening or arch. The inlet wall is in fluid communication with the furnace, while the outlet wall is in fluid communication with the pump well.

In the preferred embodiment, the outlet wall opening is covered by a filter plate. The outlet wall includes a generally flat filter plate having a plurality of through filter bores that allow molten metal to pass through the filter and into the pump well. Each filter bore is sized to prevent any solid contaminants that are larger than the pump impeller's openings to pass through the filter and into the pump well.

By filtering all of the potentially pump-damaging pieces of dross from entering the pump well, the pumps located within the pump well may be freely operated at a much higher speed, which dramatically increases the flow rate of the molten metal bath within the furnace. Running the pump at this more efficient speed will typically require the output from the pump to be diffused to optimize the penetration into the charge well, additionally any pump-safe sized solid contaminants are also preferably removed from the furnace.

A centrifugal pump's efficiency increases with rotational speed along with the flow and pressure. Increased flow and pressure increases a furnace's efficiency by increasing the melting rate; decreasing the energy lost by reducing the metal temperature stratification; and reducing the contaminants, which increases the quality of the metal produced thereby reducing the amount of nitrogen and chlorine needed to clean the metal.

It is an advantage of the present invention to provide a filtration system that will prevent large pieces of dross from damaging a furnace's molten metal pump, thereby allowing the pump to run at a higher, more efficient speed.

It is another advantage of the present invention that the filters can be readily removed and replaced from the filtration system to reduce furnace downtime.

It is still another advantage of the present invention that the filtration system provides a dross filtration well that collects and retains the filtered dross in an easily accessible location.

These and other objects, features and advantages of the present invention will become apparent from the following description when viewed in accordance with the accompanying drawings and appended claims.

BRIEF DESCRIPTION OF THE DRAWINGS

The description refers to the accompanying drawings in which like reference characters refer to like parts throughout the several views, and in which:

FIG. 4 is a partial side view of the pump well inlet filter covering the pump well inlet arch;

FIG. 5 is a top sectional view of a high flow centrifugal impeller pump;

FIG. 6 is a partial top sectional view of the through bore shape for the filtration system's filter;

FIG. 10 is a partial top view of an alternate filter retention bracket;

FIG. 11 is a sectional view through line A-A in FIG. 10;

FIG. 12 is a partial side sectional view of an alternate filter having a angled lower filter bores;

FIG. 15 is a perspective view of an another alternate configuration of the filter plate;

FIG. 19 is a cut-away perspective view of a molten metal recirculation and transfer system, including an upstream filtration well and a downstream filter/transfer well;

FIG. 20 is a rear perspective view of the filter/gate valve used in the system illustrated in FIG. 19.

DETAILED DESCRIPTION OF THE PREFERRED EMBODIMENT

Figure 1:
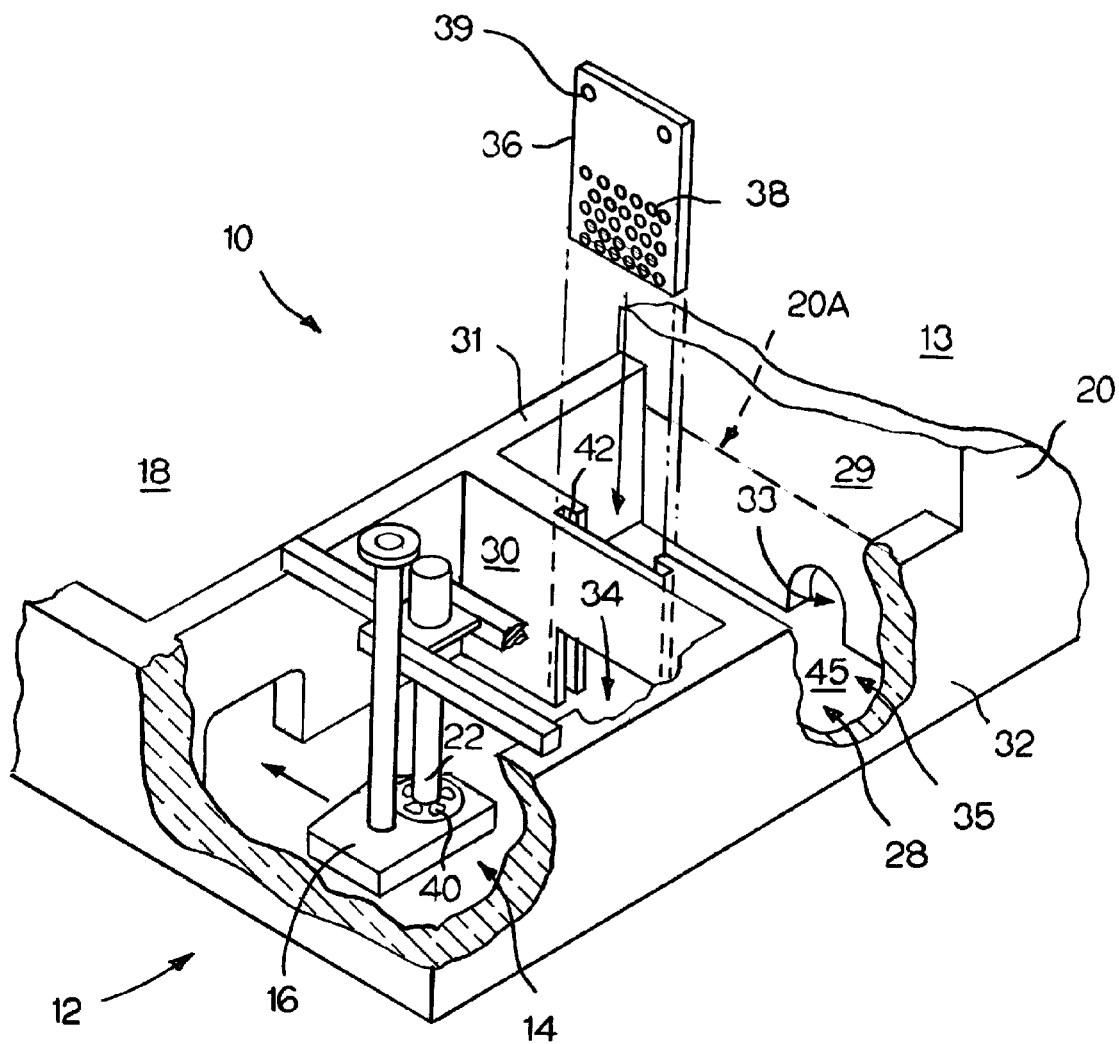
FIG. 1 is a cut-away perspective view of the preferred molten metal filtration well.
Figure 2:
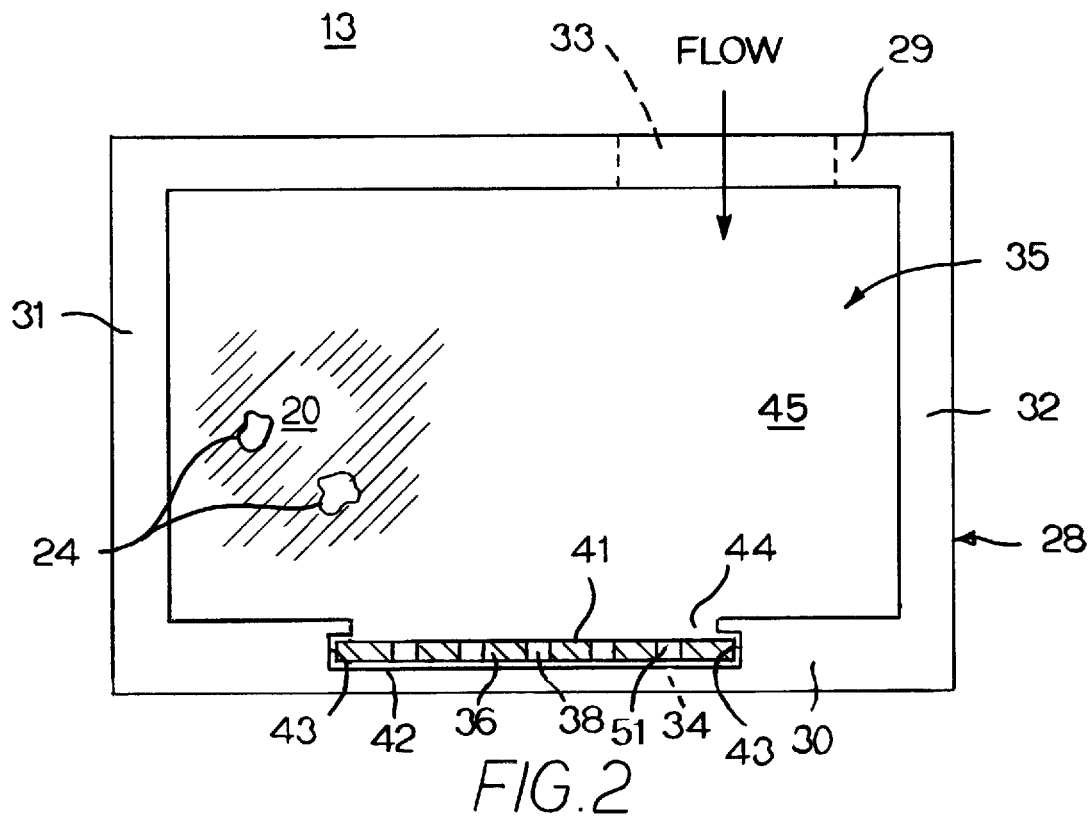
FIG. 2 is a top view of the upstream filtration well.
Figure 3:
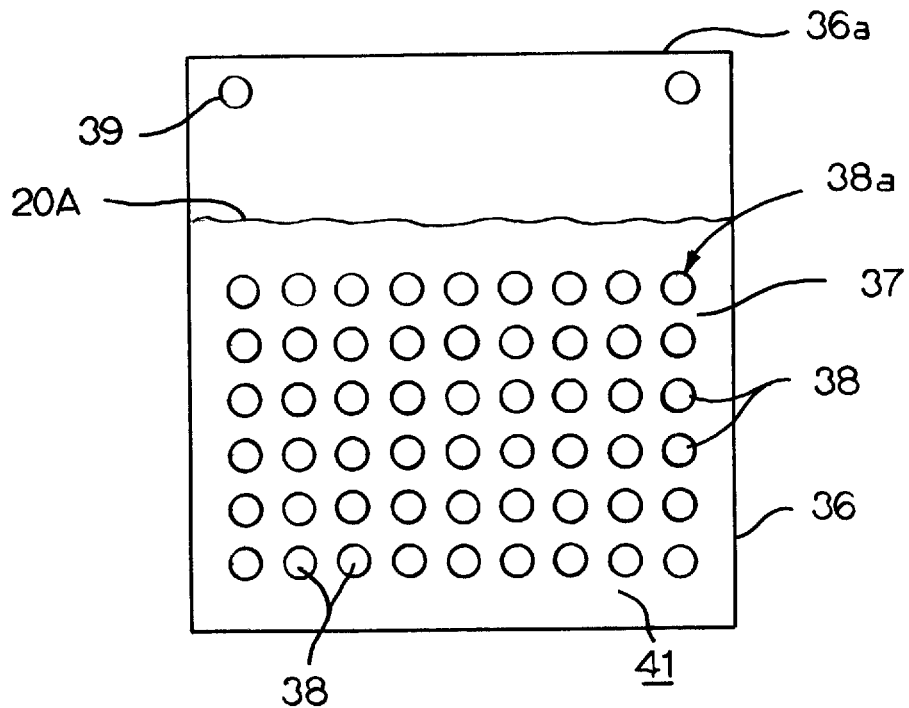
FIG. 3 is a front view of the pump well inlet filter plate.

Referring now to FIGS. 1-4, there is shown a preferred embodiment of the present invention. The present invention is molten metal filtration system 10 for a central melting or holding furnace, such as furnace 12.

A conventional furnace 12 is generally shaped as a fluid retaining enclosure. This enclosure includes a heating area or hearth 13, a pump well 14 that contains a molten metal circulation and/or a transfer pump 16 and a charge well 18. A bath 20 of molten metal is contained within furnace 12. A series of arches or gates fluidly connect the hearth, pump well and charge well allowing the molten metal to flow through the furnace. The bath 20 is heated in the hearth 13, pulled into the pump well 14 by pump 16 and accelerated out from the pump and into the charge well 18. Additional raw material sought to be melted is inserted into the furnace at charge well 18.

Pump 16 is typically a high flow centrifugal impeller pump adapted to be immersed in molten metal. Pump 16 rotates an impeller 22 to draw in and expels the molten metal forming bath 20. One example of such a pump is the type disclosed in my pending U.S. patent application Ser. No. 11/337,266 entitled HIGH FLOW/DUAL INDUCER/HIGH EFFICIENCY IMPELER FOR LIQUID APPLICATIONS INCLUDING MOLTEN METAL which is incorporated herein by reference, word for word and paragraph for paragraph. It should be appreciated that while pump 16 is being described as a centrifugal impeller-type of pump, it can be substantially any style pump suitable for use in a molten metal environment.

Bath 20, while being primarily composed of the intended molten metal material, also contains solid contaminants or dross that flows throughout furnace 12. Dross varies in size from particulate-type matter to large pieces 24 that can be at least partially pulled into pump 16. These larger pieces of dross 24 oftentimes jam the rotating impeller 22, resulting in damage to or clogging of the pump.

Filtration system 10 includes a filtration well 28 that is located within furnace 12 between hearth 13 and pump well 14. Filtration well 28 is preferably a rectilinear enclosure defined by two pairs of opposed vertical walls 29-30 and 31-32. Walls 29-32 are formed from the same material as the other furnace enclosure walls, typically a castable refractory cement. Two of the opposed walls 29 and 30 include passages or arches 33, 34.

Filtration well 28 is disposed relative to the rest of furnace 12 such that wall 29 separates well 28 from hearth 13, while its interior region 35 is in fluid communication with hearth 13 via arch 33. Wall 30 separates well 28 from pump well 14, while interior region 35 is in fluid communication with pump well 14 via arch 34. Walls 31, 32 complete well 28 and separate the two arched walls 29, 30. As will be described in greater detail below, the distance walls 29, 30 are spaced is sufficient to allow filtration well 28 to be readily cleaned out and to retain a significant amount of dross 24.

Filtration well 28 includes at least one filter 36. Filter 36 is preferably a rectangular flat sheet or plate body 37 formed from a ceramic material, such as silicon carbide or silicon nitride reaction-bonded silicon carbide. Filter 36 includes a plurality of substantially identical through bores 38, which are arranged in an array and cooperate to form a rough screen or filter in body 37. Importantly, each through bore 38 is sized slightly smaller than the impeller inlet opening 40 of the pump 16. In this manner, the diameter of through bore 38 is wholly dependent upon the inlet opening 40 of the pump 16 located within the furnace 12 being filtered. In a typical furnace 12, inlet opening 40 will be approximately 1½ inches in diameter, and the through bores 38 for such an inlet size would be approximately 1 to 1¼ inches in diameter. In one non-limiting embodiment, the area of the upstream openings 38a is approximately 90% of the size of the impeller inlet opening 40 for the pump 16 located in pump well 14.

It should be appreciated that by substantially covering the filter body 37 with through bores 38, the flow of the molten metal 20 is not impeded, with negligible pressure drop across the arch-covering filter 36.

In one embodiment, as shown in FIG. 6, each through bore, denoted 38', has a frusto-conical shape where the opening 38a' at the upstream face 41 (i.e., the side that faces the bath 20 within region 35) of plate 36 tapers outwardly to the downstream opening 38b'. In this embodiment, opening 38a' is substantially the same size as opening 38a and will block any solid contaminants larger than impeller inlet opening 40. This tapered shape of the through bores 38' reduces the possibility of the filter clogging and further reduces the difference in fluid pressure across filter 36.

Filter plate 36 is disposed within filtration well 28 and is sized to cover the filtration well's outlet arch 34 (i.e., the pump well's inlet arch). It should be understood that the size and shape of filter plate 36 may vary as long as it substantially covers arch 34. In an embodiment illustrated in FIG. 2, wall 30 includes a filter slot 42 that is formed down through the top surface 30a of wall 30. Slot 42 is shaped complementary to and is sized to receive filter plate 36. Slot 42 intersects and is substantially co-planar with arch 34. Slot 42 extends longitudinally beyond arch 34 along wall 30 forming a pair of vertical channels 43 that abuttingly receive the opposite edges of filter plate 36 and cooperate to retain the filter plate within filtration well 28. In one embodiment, the upstream face of wall 30 includes an opening 44 approximately the same width as arch 34 and extends up through the top surface 30a of wall 30. Opening 44 is aligned with and intersects slot 42 and presents the substantially the entire upstream face 41 of filter 36 to the metal bath in filtration well 28.

As best shown in FIG. 4, filter 36 preferably projects from its retention means above the upper surface 30a of wall 30, such that the top edge 36a may be grasped to remove filter 36 from furnace filtration system 10. Means for withdrawing the filter, such as apertures 39 formed through the filter 36 proximate to its top edge 36a, are preferably provided to facilitate removal of filter 36 from the furnace 12.

In the embodiment illustrated in FIG. 1, arches 33, 34 are formed in the walls 29, 30. Each arch 33, 34 preferably is an opening extending up the wall from the floor 45 of the filtration well 28. It should be understood that the location, shape and/or size of these arches may vary and that the filters and filter retaining means, such as slot 42, may vary accordingly.

Figure 7:
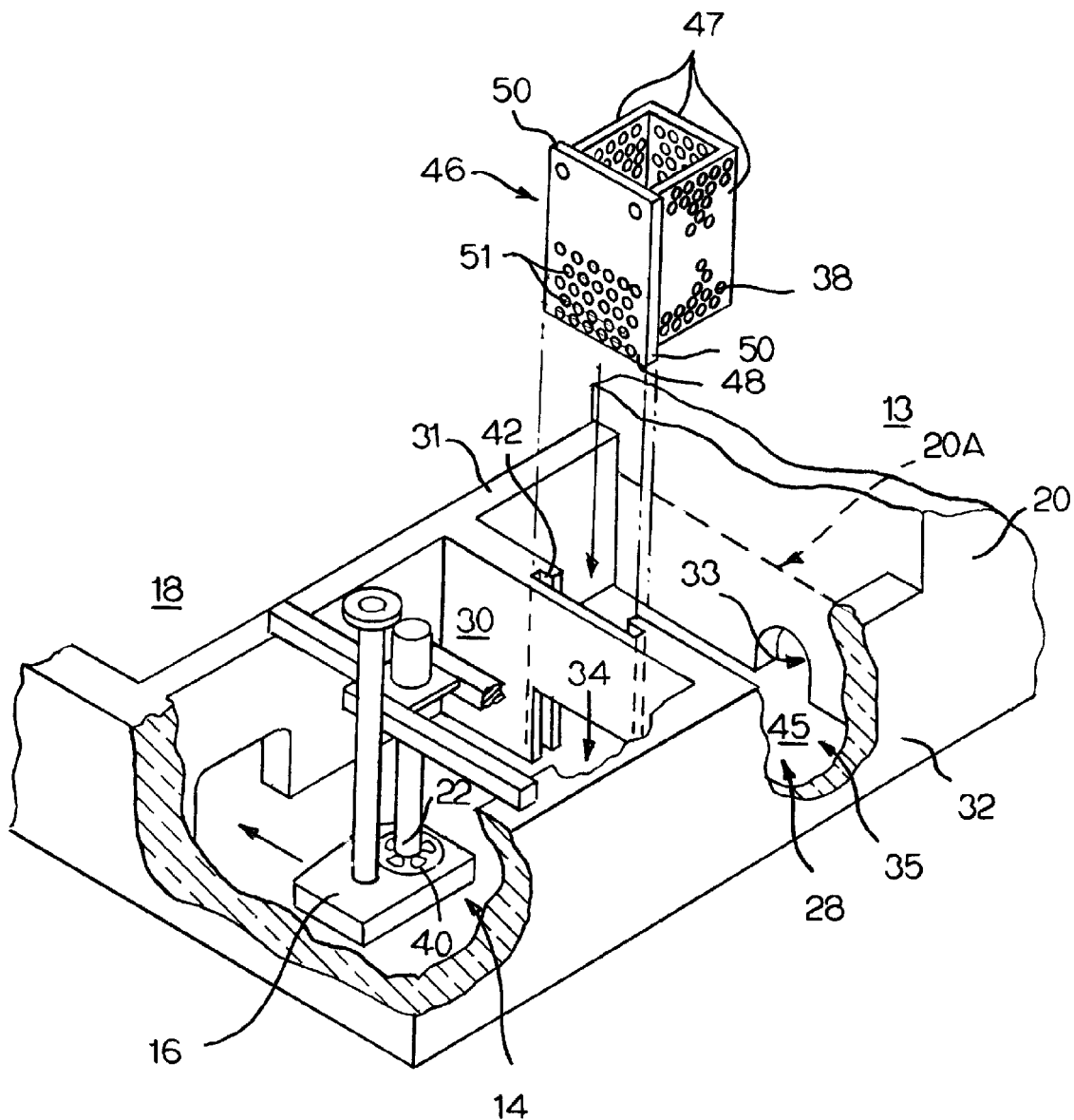
FIG. 7 is a cut-away perspective view of the molten metal filtration well and an alternate configuration of the filter.
Figure 8:
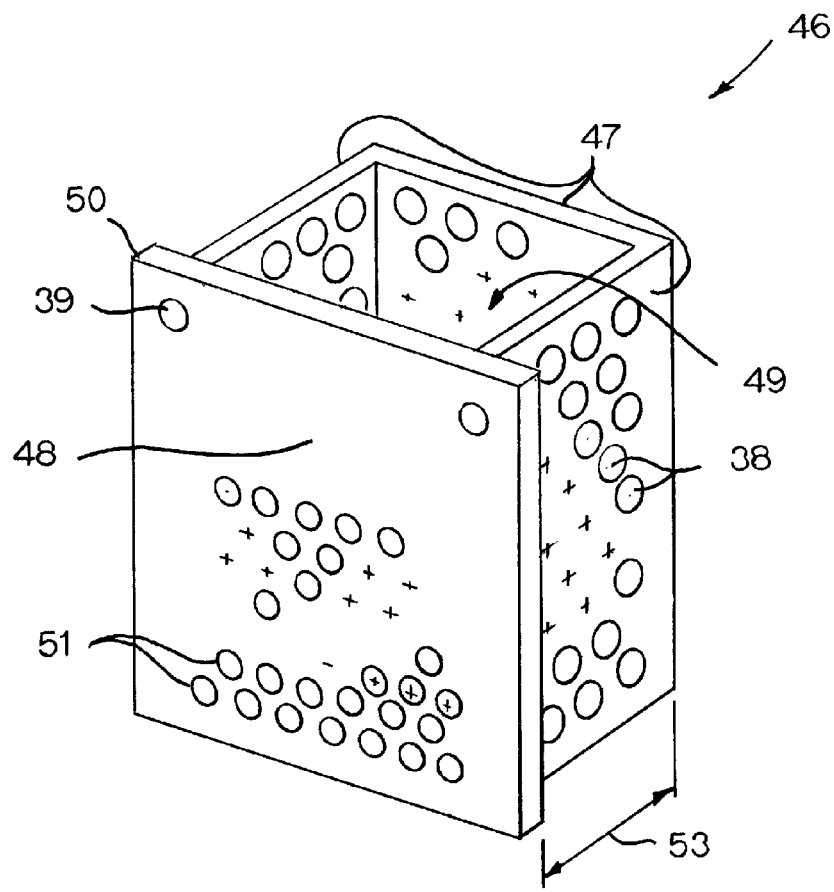
FIG. 8 is a perspective view of the alternate configuration of the filter shown in FIG. 7.
Figure 9:
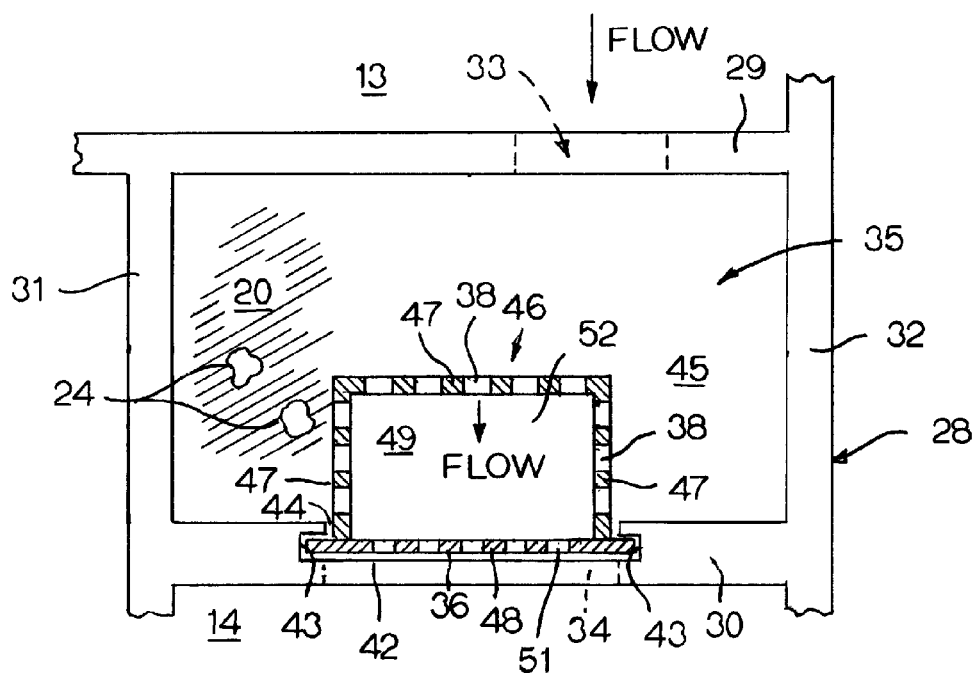
FIG. 9 is a top view of the upstream filtration well shown in FIG. 7 with an alternate configuration filter installed.

Referring now to FIGS. 7-9, another embodiment of filtration well 28 replaces filter 36 with a box filter 46. Filter 46 includes a rectangular box-like body that is formed from three upstream plate-like filter walls 47, which are each similar in construction to filter 36. Each filter wall 47 includes a plurality of identical through bores 38, which are identical to the through bores formed in filter 36. A fourth downstream filter wall 48 completes the box-like configuration to define an internal chamber 49. It should be appreciated that the four-walled box configuration is exemplary in nature and that substantially any number of walls could be used to form box filter 46.

In the preferred embodiment, downstream filter wall 48 is sized to be received in slot 42, while upstream walls 47 project into filtration well 28. That is, the outermost edges of downstream wall 48 extend beyond the upstream walls 47 forming a pair of outer mounting flanges 50 which are received within channels 43.

Downstream filter wall 48 includes an array of identical through bores 51. These bores 51 are smaller than bores 38. The reduced size of bores 51 enables filter wall 48 to screen or filter even smaller particles of dross from the bath of molten metal, which may dynamically impact and damage the rotating impeller at higher rotating velocities.

Each through bore 38 in filter 46 is approximately 10% to 20% smaller than impeller inlet opening 40 to cause dross 24 that would otherwise damage the downstream pump 16 to be retained in filtration well 28. In one embodiment, box filter 46 includes a closed bottom 52 that interconnects each of the walls 47, 48 and allows the filter 46 to be periodically removed from well 28 to be emptied/cleaned and subsequently re-installed. In one embodiment, box filter 46 is approximately one-half to two-thirds the size of the filtration well 28.

Box filter 46 thereby provides dual filtration by first screening out any pieces of dross that are larger than the impeller inlet opening 40 via upstream through bores 38 in walls 47. These larger pieces of dross are retained within filtration well 28. The finer filter bores 51 formed in downstream wall 48 further screens out even smaller pieces of dross to further protect the pump. That is, bores 51 block pieces of dross that will pass through the pump 16, but may cause damage to the impeller 22 when the pump is run at higher velocities. These smaller pieces of dross are retained with retention chamber 49. The pump 16 can then be accelerated to higher RPMs.

The above description illustrates how furnace filtration system 10, through filters 36, 46 and filtration well 28 prevents the larger non-pumpable pieces of dross 24 from entering pump well 14, thereby preventing dross 24 from damaging or clogging the pump. In turn, system 10 enables a user to run pump 16 at a higher speed. By eliminating the chance of a dross 24 jamming pump 16, the pump can be run at a speed that is at or near its peak efficiency, instead of a typical slower speed that may save the pump if such a contaminant was pulled into the pump (i.e., by running at a slower speed, the pump may only stop turning instead of resulting in a catastrophic/breakage event).

Further, by retaining all of the potentially pump-damaging dross pieces 24 within filtration well 28, filtration system 10 can be readily cleaned by shoveling or scraping the floor 45 between the spaced upstream and downstream walls 29, 30.

In other embodiments, shown in FIGS. 10 and 11, the filter slot 42 of filtration well 28 are replaced or supplemented by guide brackets 54 that are anchored to the top 30a of wall 30 proximate to the arch 34. These brackets 54 receive a filter and hold the filter plates 36 or filter box 46 over the arch opening.

In one embodiment, filters 36, 46 and their corresponding retention means 42, 54 are complementarily shaped so that the filters cannot be placed backwards.

In still another embodiment, illustrated in FIG. 12, the bottom-most row or rows or through bores 38" are angled upward from upstream face 41 to the downstream face of the filter 36, 46. This upward angle directs the flow of molten metal bath 20 slightly upward and causes the flowing bath 20 to exert a downward force on the filter 36, 46. This downward force resists any upheaval of filter 36, 46 as bath 20 flows through the through bores, while ensuring that the upwardly directed flow through bores 38" is dispersed by the remaining through bores 38 to prevent any ripples on the surface of bath 20, which could result in increased oxidation of the molten metal.

Figure 16:
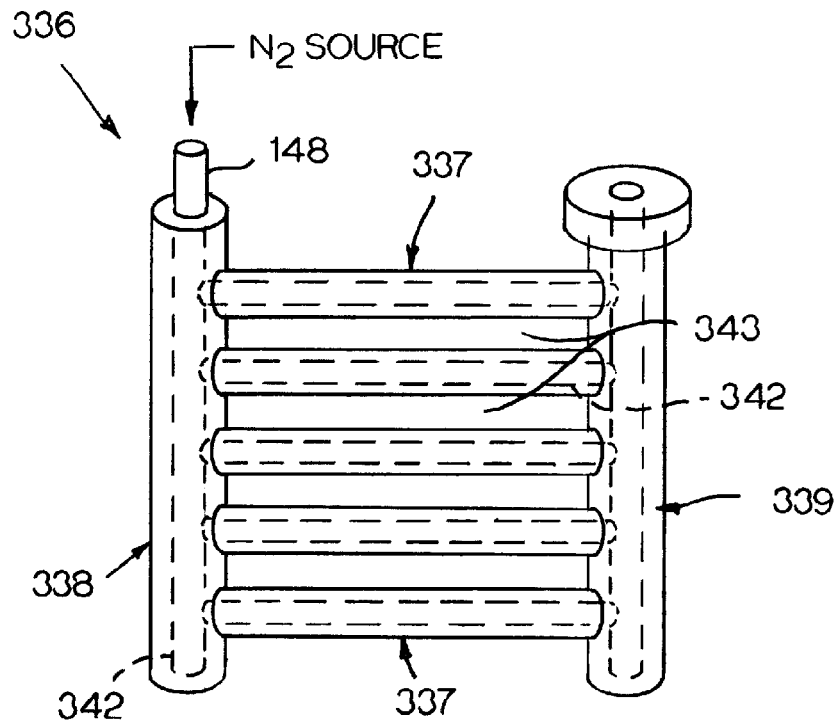
FIG. 16 is a front view of still another alternate configuration of the filter plate, including inert graphite filter grates.
Figure 17:
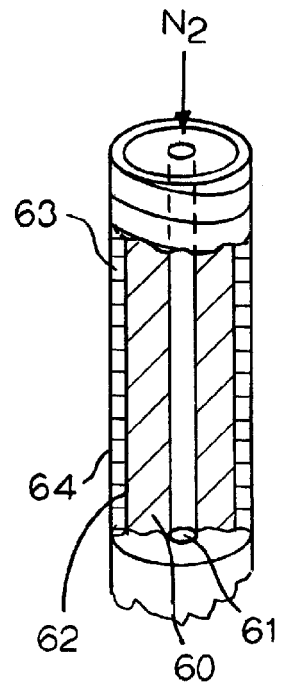
FIG. 17 is sectional view of an inert gas saturated, insulated, graphite filter tube.

Referring now to FIGS. 13-18 and as disclosed in my previous U.S. Pat. No. 6,168,753 entitled INERT PUMP LEG ADAPTED FOR IMMERSION IN MOLTEN METAL which is incorporated herein by reference, word for word and paragraph for paragraph, injecting an inert gas into a graphite body having sufficient porosity to house the inert gas prevents the entry of either air or molten metal inside the flow tube—filtration plate. As best shown in FIG. 17, a graphite tube 60 having an axial internal passage 61 is coated or covered with a layer 62 of suitable refractory cement material mixed with boron nitride paint.

A layer of nylon or fiberglass tape 63 covers the cement coated tube and is preferably wrapped around the tube in a helical pattern to ensure coverage of the tube. An outer layer 64, also a mix of cement and boron nitride paint coats the tape layer 63. The tape layer 63 is cemented by a combination of the refractory cement and boron nitride paint which constitutes inner and outer layers 62 and 64.

As disclosed in my previous patent, an inert gas (e.g., nitrogen or argon) is pumped into passage 61 and the graphite is sufficiently porous to house the inert gas and prevent the entry of either air or molten metal to prevent the graphite from burning in the molten bath 20.

It should be appreciated that multiple graphite tube 60 may be interconnected such that each internal conduit 61 is in fluid communication and where each insulating layer (e.g., layers 62, 63, and 64) substantially cover the molten metal-contacting surfaces, typically the outermost surfaces.

Figure 13:
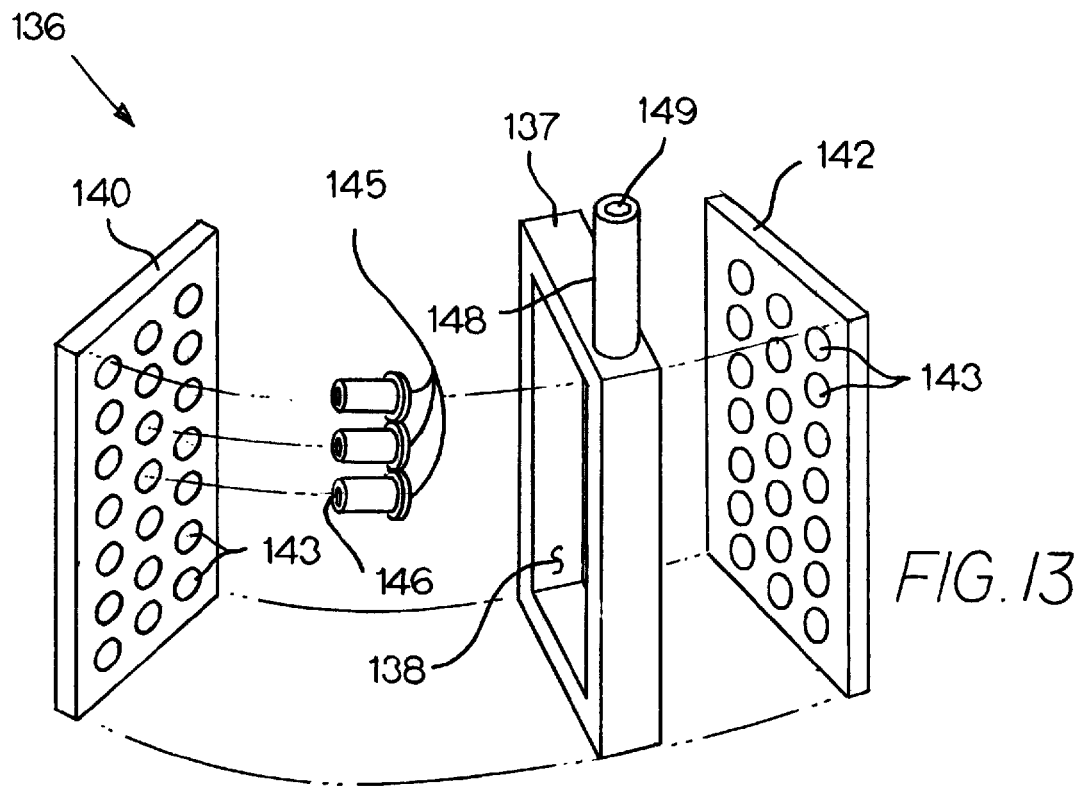
FIG. 13 is a partially exploded perspective view of an alternate filter having inert graphite filter tubes.
Figure 14:
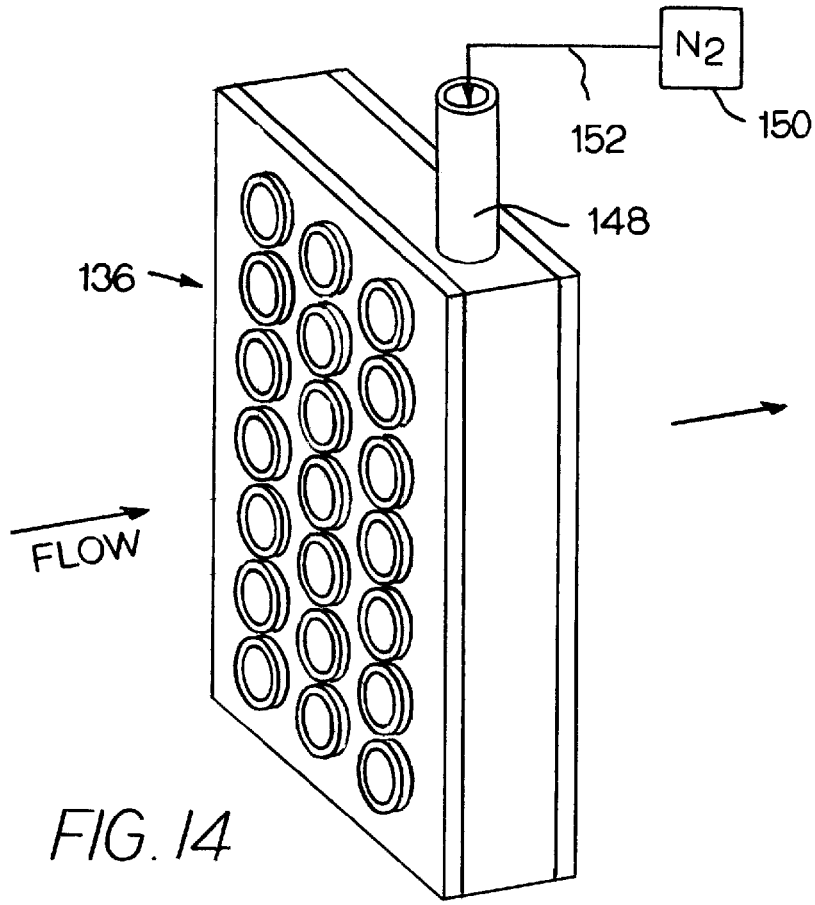
FIG. 14 is an assembled perspective view of the alternate filter shown in FIG. 13.

FIGS. 13 and 14 illustrate an alternate filtration plate, denoted 136, having a generally rectangular frame 137 defining an interior cavity 138. Frame 137 is sandwiched between two plates 140, 142, which are similar in construction to filter plate 36, having a plurality of bores 143 formed therethrough. Like plate 36, plates 140, 142 are preferably formed from a molten aluminum heat resistant ceramic material, such as silicon carbide, silicon nitride reaction-bonded silicon carbide, or insulated-nitrogen saturated graphite to avoid burning at the metal line 20A as discussed above and as disclosed in my previous U.S. Pat. No. 6,168,753. It should be appreciated that each bore 143 in the upstream plate 140 is axially aligned with a bore 143 in the downstream plate 142.

A graphite flow tube 148 is mounted within cavity 138 between the plates 140, 142. Flow tube 148 is of a generally tubular construction and spans the gap between each aligned bore 143 of the opposing plates 140, 142, such that through bore 146 formed in each flow tube traverse the thickness of filtration plate 136. In the preferred embodiment each flow tube fits within bores 143 and is cemented to plates 140, 142 using refractory cement. A complementarily shaped ceramic or graphite frame 137 is disposed within and cemented to each plate 140, 142 to prevent the molten aluminum from coming inside the filter body pressurized with nitrogen. Filtration plate 136 includes a fitting 148 having a gas-receiving passage 149 which is in fluid communication with cavity 138 for receiving an inert gas, such as nitrogen or argon, from a source 150 through conduit means 152. Nitrogen is preferably injected into cavity 138 and is received by and saturates the graphite flow tubes 145 to prevent the tubes exposed above the molten metal line 20A of furnace 12 from burning. In this embodiment, flow tubes 145 are shaped substantially the same as filter bores 38.

Referring now to FIG. 15, an alternate embodiment of a filtration plate, denoted 236, is shown having a plurality of spaced parallel bars or tubes 237 that are coupled together at their opposite ends by a pair of support members 238, 239. Each bar or tube 237 is a generally cylindrical bar or tube formed from a heat resistant silicon carbide ceramic material or graphite which is properly insulated. With respect to the preferred graphite tube embodiment, the insulated graphite tubes are nitrogen saturated. The tubes 237 are spaced apart such that the gap 240 between adjacent tubes 237 is slightly smaller than the impeller inlet opening 22 of pump 16. In this manner, plate 236 operates in substantially the same manner as filter plate 36. The upper and lower support members 238, 239 include a plurality of spaced apertures 241 which are shaped complementary to the tubes 237. Tubes 237 are preferably fixed to support members 238, 239 with refractory cement.

In this embodiment, both the upper and lower support bars 238, 239 include internal passages 241 which are in fluid communication with the passages 61 of tubes 237. The upper support bar 238 includes a fitting 148 which is in fluid communication with passages 61 and 241 for receiving an inert gas, such as nitrogen. The upper support bar 238 further includes retrieval apertures 39, which enable the plate 236 to be readily retrieved. It should be appreciated that these apertures 39 are not connected with the nitrogen passage 241. It should further be appreciated that plate 236 is sized to be readily received within retention means, such as slot 42 or guide brackets 54 located proximate to furnace arch 33. While the embodiment illustrated in FIG. 15 depicts the filter bars 237 running vertically, it should be appreciated that bars 237 can be oriented at substantially any angle.

Referring now to FIG. 16 an alternate embodiment of the filtration plate 236, denoted 336 is illustrated incorporating the inert graphite tubing described above. Filtration plate 336 includes a plurality of spaced graphite tubes 337 that span and interconnect a pair of graphite support members 338, 339. Tubes 337 and members 338, 339 are insulated by applying a layer 62 of refractory cement mixed with boron nitride paint. Layer 62 bonds the layer 63 of fiberglass or nylon tape to the graphite bodies 337-339. The tape layer 63 is coated with another layer 64 of suitable refractory cement and boron nitride paint mixture. Each graphite body 337-339 includes an internal conduit 342 (i.e., passages 61) which are fluidly interconnected and which receives an inert gas, such as nitrogen, through a fitting 148 mounted to one of the support members. Each tube 337 is spaced apart from the adjacent tube 337 a distance forming a gap 343 that is smaller than the impeller inlet opening 22. Like filter plate 136, filter plate 336 is sized to substantially cover inlet arch 33, effective to prevent over-sized pieces of dross 24 within the furnace from entering the pump well 14.

Figure 18:
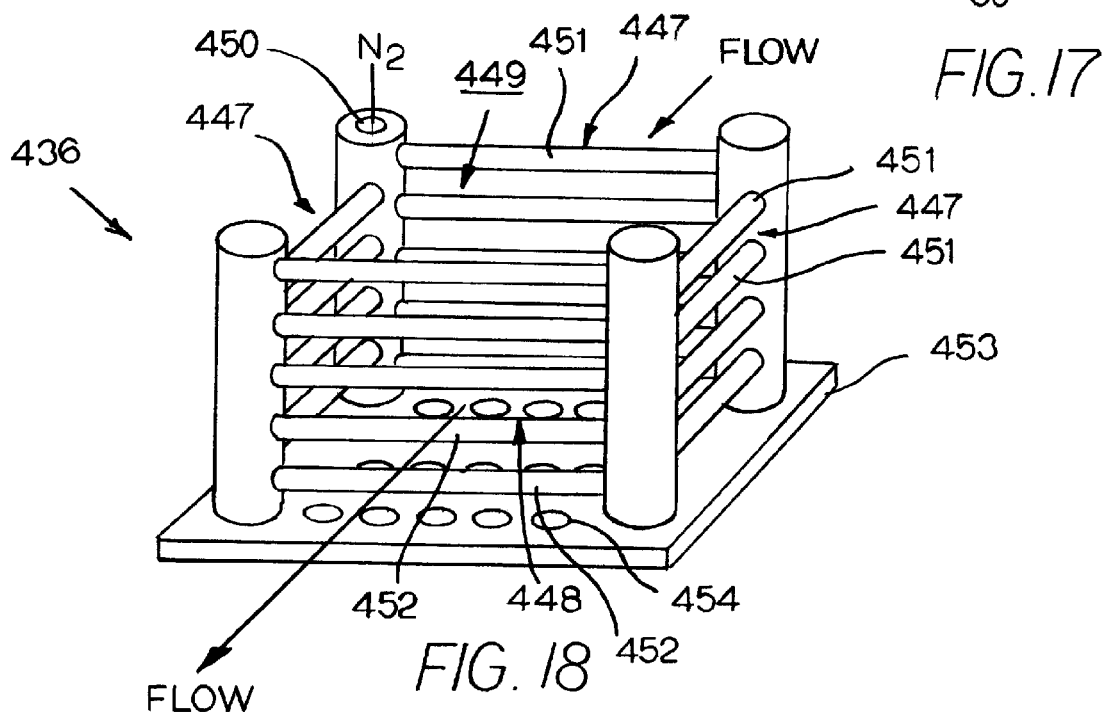
FIG. 18 is a perspective view of yet another alternate configuration of the filter.

Referring now to FIG. 18 yet another embodiment of a molten metal furnace filter, denoted 436 is shown. Filter 436, like filter 46 is a box or basket filter having three upstream walls 447 and one downstream wall 448 which cooperate to define an inner cavity or space 449. Each wall in filter 436, unlike filter box 46, is formed from an inert gas graphite filter body, similar to filter plate 336.

That is, each of the three upstream walls 447 and the downstream wall 448 is formed from insulated graphite tubes, which are substantially the same as tubes 60. The walls of filter 436 have an internal passage 450 (i.e., interconnected passages 61) that is injected with an inert gas, such as nitrogen. In the preferred embodiment, the internal passages within each wall are fluidly connected and receive nitrogen gas through a common fitting, such as fitting 148. Like filter box 46, the upstream walls are configured to prevent oversized pieces of dross from entering space 449, such that the plurality of parallel filter tubes 451 are spaced apart a distance that is slightly smaller than the impeller inlet opening 22. The downstream wall 448 includes parallel filter tubes 452 which are spaced even closer together than tubes 450 to further filter even smaller pieces of dross from entering the pump well 14.

In one embodiment, filter 436 includes a bottom plate 453 which includes a plurality of drain holes 454, which aid in draining the molten metal from filter 436 when filter 436 is removed from furnace 12.

Referring now to FIGS. 19 and 20 an alternate embodiment of filtration system 10 is shown where filtration well 28 is supplemented with a secondary transfer filtration unit 500 that is proximate to the pump well outlet arch 502 and charge well 18. Filtration unit 500 includes a box filter/gate valve 504 that is similar in construction to filters 36 and 46. This filter 504, however, is configured to screen out or filter much smaller solid contaminants, which readily pass through pump 16. In one embodiment, filter 504 includes a plurality of through bores 506 that are approximately ¹⁄₁₆th to ⅛th inches in size.

Filtration unit 500 is disposed downstream of the outlet 70 of pump 16. As shown in FIG. 19, unit 500 preferably includes a transfer well 507 that is defined by spaced dual walls 508, 509. Well 507 is located between pump well 14 and charge well 18.

The upstream wall 508 contains pump well outlet arch 502 and includes filter retention means, such as a filter guide slot 510, which is similar in construction to slots 42 described above, such that filter 504 covers arch 502. Similarly, downstream wall 509 contains charge well inlet arch 512 and includes filter retention means, such as filter guide slot 514, which is substantially the same as and faces slot 510. A transfer spout or outlet 516 is formed in the upper portion of the outer wall of well 507.

As shown in FIG. 20, filter 504 has a box-like configuration having three upstream filter walls 517 and a fourth downstream solid wall 518. Filter walls 517 are similar to walls 47 of filter box 46, with each walls 517 configured as a fine particle filter using a plurality of through bores 506.

As the filter box 504 is lowered along slots 510, 514, solid wall 518 will close off the recirculation arch 512 (i.e., the arch passing into the charge well 18). Molten metal will begin filling transfer well 506 being filtered by a fine particle filter bores 506 in walls 517. When the metal reaches the level of spout 516, it will begin to transfer the finely filtered molten metal out of the furnace 12. In this embodiment a bottom wall 520 interconnects the four walls 517, 518

As the box filter/gate valve 504 is lifted, the pump 16 will resume recirculating the molten metal through the arches 502 and 512 in a normal manner with the bottom 520 of the filter box 504 as a top guide for the flow.

Figure 21:
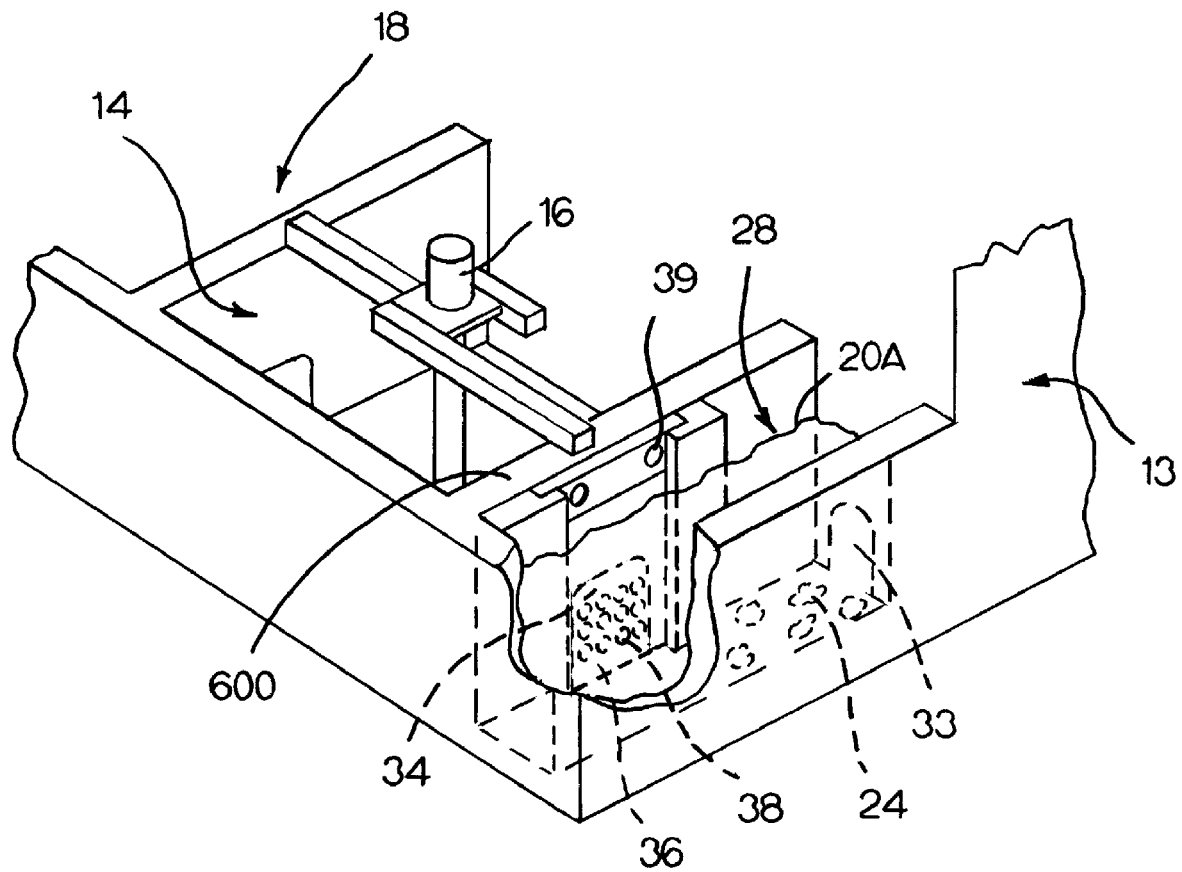
FIG. 21 is another alternate embodiment illustrating a furnace filtration system formed by adapting a pre-existing furnace pump well.

Referring now to FIG. 21 another embodiment of furnace filtration system 10 is illustrated, having a more compact filter well 28 which may be formed by adapting a pre-existing furnace 12 by reducing the size of pump well 14 by adding an additional wall 600 having another inlet arch 34 and filter retention means. In this embodiment, wall 600 is located between the original pump well return arch and the pump 16. The original pump well return arch operates as the hearth return arch 33 discussed above.

From the foregoing description, one skilled in the art will readily recognize that the present invention is directed to a furnace molten metal filtration well, a system utilizing such a filtration well, and methods for using the same to improve pump speed and efficiency. While the present invention has been described with particular reference to various preferred embodiments, one skilled in the art will recognize from the foregoing discussion and accompanying drawing and claims that changes, modifications and variations can be made in the present invention without departing from the spirit and scope thereof.

The invention claimed is:

1. A furnace filtration well adapted to filter solid contaminants from a bath of molten metal that are too large to pass through the impeller openings of a centrifugal impeller pump located within a pump well, comprising:
    at least two walls that cooperate to define an enclosure, said walls including an upstream wall and a downstream wall, said upstream wall including an inlet arch and said downstream wall including an outlet arch that is in direct fluid communication with said pump well; and
    filter means covering said outlet arch, whereby said molten metal flows therethrough, said filter means including a plurality of spaced graphite tubes saturated with an inert gas and preventing solid contaminants that are sized larger than said impeller openings from passing into said pump well, but allowing any solid contaminants that are at least ten percent smaller than said impeller openings to flow into said pump well.

2. A furnace filtration well as defined in claim 1, wherein said enclosure is substantially rectilinear and said upstream and downstream walls are on opposing sides of said filtration well.

3. A furnace filtration well as defined in claim 1, wherein said filter bores taper from a narrow upstream opening in an upstream face of said plate to a wider downstream opening in a downstream face of said plate to prevent a pressure drop across said plate.

4. A furnace filtration well as defined in claim 1, wherein said filter means includes a plurality of spaced parallel bars, wherein the bars are spaced apart slightly smaller than said impeller opening.

5. A furnace filtration system for a molten metal bath in a furnace having a pump well containing a centrifugal impeller pump, said impeller pump having impeller inlet openings that receive and pump molten metal and any solid contaminants within said molten metal that are smaller than said impeller inlet openings, comprising:
    an upstream filtration well that is fluidly coupled upstream to said pump well, said filtration well including an inlet wall having an inlet arch and a spaced outlet wall having an outlet arch, wherein said filtration well is in fluid communication with said pump well through said outlet arch;
    a filter that is sized to cover said outlet arch, said filter including a plurality of filtering passages, each of said filtering passages having an inlet area that is approximately ninety percent of the size of the area of said impeller inlet openings, whereby contaminants larger than said filtering passages are retained within said upstream filtration well and molten metal and any contaminants that are at least ten percent smaller than said impeller inlet openings pass through said filter and into said pump well; and means for removably retaining said filter over said outlet arch.

6. A furnace filtration system as defined in claim 5, wherein said filtering passages comprise a plurality of filter bores passing through said filter.

7. A furnace filtration system as defined in claim 5, wherein said filtering passages are defined by the spaces between a plurality of spaced parallel bars.

8. A furnace filtration system as defined in claim 5, wherein said filter comprises a primary filter body containing said filtering passages and wherein said filter further comprises:

a secondary filter body having secondary filtering passages which are smaller than said filtering passages, wherein said secondary filter body is disposed downstream of said primary filter body when said filter covers said outlet opening.

9. A furnace filtration system as defined in claim 6, wherein each of said filter bores has a frustoconical shape, tapering outwardly from an upstream portion to an enlarged diameter in a downstream portion.

10. A filtration system as defined in claim 5, wherein said filter is formed from a silicon nitride bonded silicon carbide material.

11. A filtration system as defined in claim 7, wherein said parallel bars are a plurality of graphite tubes having an axial passage and each of said tubes is coated with a non-gaseous inert material; further comprising:

a source of inert gas which is fluidly coupled to said axial passages, wherein said graphite tubes are saturated by an inert gas from said source.

12. A filtration system as defined in claim 11, wherein said inert material includes a tape, and a coating of refractory cement mixed with boron nitride paint.

13. A filtration system as defined in claim 5, wherein said pump well is in fluid communication with a downstream charge well, further comprising:

a transfer well that is fluidly coupled between said pump well and said charge well, said transfer well including a pair of spaced filter walls and outlet means which allow molten metal to transfer out of said transfer well when the level of molten metal rises beyond a certain height; and a gate filter having a solid downstream wall and at least one upstream filtration wall, said filtration walls including a plurality of secondary filter bores, each of said secondary filter bores having a diameter that is smaller than said filter bores, whereby contaminants larger than said secondary filter bores are retained within said transfer well; wherein said gate filter is movable from a first raised position in which molten metal is free to pass through said transfer well and into said charge well to a second lowered position in which the gate filter prevents said molten metal from passing into said charge well, thereby raising the level of said molten metal within said transfer well.

14. A method of increasing the efficiency of a recirculation furnace for non-ferrous metals by increasing the operating speed of a centrifugal pump within a bath of molten non-ferrous metal contained within the furnace, comprising the steps of:

providing a centrifugal pump having a pump impeller with pump impeller openings;

forming a filtration well directly upstream of a pump well containing said pump and downstream of a hearth, wherein said filtration well includes a pair of spaced walls, and wherein one of said walls includes an inlet arch and the other wall includes an outlet arch, said outlet arch being in fluid communication with said pump well;

providing a furnace filter comprising the steps of:
    providing a generally flat ceramic plate; and
    forming a plurality of apertures through said plate, wherein each of said apertures is sized approximately ten percent smaller than said pump impeller openings;

pumping any contaminants within said molten metal bath that have a size that is at most ninety percent of said pump impeller openings through said centrifugal pump; and preventing all solid contaminants that are larger than said pump's impeller openings from entering said pump well by covering said outlet arch with said furnace filter, thereby containing the solid contaminants that are larger than said pump's impeller openings between the spaced walls of the filtration well.

15. A method as defined in claim 14, further comprising the step of:

extracting said contained solid contaminants from said filtration well.

16. A method as defined in claim 14, wherein said step of providing a furnace filter includes the steps of:

providing a box filter including at least one upstream wall having filtration passages which are smaller than said pump impeller openings and a downstream wall having fine filtration passages which are smaller than said filtration passages.

17. A method as defined in claim 14, wherein said step of providing a furnace filter includes the steps of:

providing a plurality of graphite tubes having an axial passage;

forming a grate by interconnecting said tubes such that said tubes are spaced apart a distance which is smaller than said pump impeller openings;

coating said grate in a non-gaseous inert material; and saturating said graphite tubes with an inert gas pumped through said axial passages.

* * * * *